United States Patent [19]

Wilner

[11] Patent Number: 4,609,968
[45] Date of Patent: Sep. 2, 1986

[54] GLASS INLAYS FOR USE IN BONDING SEMICONDUCTOR WAFERS

[75] Inventor: Leslie B. Wilner, Palo Alto, Calif.

[73] Assignee: Becton, Dickinson and Company, Franklin Lakes, N.J.

[21] Appl. No.: 728,893

[22] Filed: Apr. 30, 1985

Related U.S. Application Data

[63] Continuation-in-part of Ser. No. 611,765, May 18, 1984.

[51] Int. Cl.⁴ .................. H01G 7/00; H01L 21/306; G01L 9/12
[52] U.S. Cl. .................. 361/320; 156/272.2; 338/2; 361/283
[58] Field of Search .............. 29/25.42; 361/283, 320, 361/321; 156/272.2; 338/2

[56] References Cited

U.S. PATENT DOCUMENTS

| | | | |
|---|---|---|---|
| 3,210,171 | 10/1965 | MacDonald | 156/272.2 X |
| 3,713,068 | 1/1973 | Talmo | 338/2 |
| 4,079,508 | 3/1978 | Nunn | 338/2 X |
| 4,188,258 | 2/1980 | Mounteer et al. | 338/2 X |
| 4,424,713 | 1/1984 | Kroninger et al. | 361/283 X |
| 4,495,820 | 1/1985 | Shimada et al. | 73/724 |
| 4,506,435 | 3/1985 | Pliskin et al. | 29/576 |
| 4,530,029 | 7/1985 | Beristain | 361/283 |

*Primary Examiner*—Donald A. Griffin
*Attorney, Agent, or Firm*—Robert P. Grindle

[57] ABSTRACT

A structure is provided, such as a capacitive transducer, utilizing two or more layers of semiconductor material wherein a highly insulating low capacitance bond is achieved by the invention herein between two adjacent layers by forming an inlay of glass in one layer and anodically bonding the other layer to the polished surface of the previously formed inlay.

15 Claims, 10 Drawing Figures

GLASS INLAYS FOR USE IN BONDING SEMICONDUCTOR WAFERS

BACKGROUND AND STATEMENT OF THE INVENTION

This invention is a continuation-in-part of application Ser. No. 611,765 filed May 18, 1984, which is hereby incorporated by reference in its entirety.

That application teaches a representative embodiment of a device utilizing the inlays of the invention herein. The invention herein involves the use of glass inlays in a structure of two or more layers of semiconductor material in order to achieve a highly insulating, low capacitance bond between two adjacent layers by forming the glass inlay of the invention in one of the layers, and anodically bonding the other layer to the polished surface of the previously formed inlay.

Previous anodic bonding of layers in structures of the kind discussed herein have a variety of limitations. The most commonly used structure is silicon bonded to bulk borosilicate glass. The thermal expansions of commercial borosilicate glasses do not match perfectly with the thermal expansion of the silicon, and the bonded silicon is left with both some residual tension or compression, and a change of that stress with temperature. As will be understood, in the extreme miniaturization of such objects as transducers in the last several years, it is most important to reduce to a minimum any such tension or stress characteristics because each minor change caused by these characteristics has a major effect upon the operating abilities of the structure involved. Moreover, solid bulk glass also makes the area within a bonded rim electrically inaccessible. Therefore, in order to gain access, extraordinary measures must be taken such as, for example, a laser-drilling of a hole through the bulk glass, and sealing in a conductor with a glass-to-metal seal.

One structure using a sheet of glass intermediate between two silicon layers is implicit in the teachings of U.S. Pat. No. 3,713,068. That structure requires a sheet of glass thick enough to handle (at least 0.127 millimeters), and makes the thickness of the glass the closest possible proximity of the two silicon parts. Further prior embodiments include sputter-deposition of borosilicate glass for anodic bonding. This procedure is satisfactory for glass layers of the order of two microns thickness. Because of the energy needed to transfer by sputtering, layers of the order of ten microns thickness become inordinately expensive. If the substrate onto which the borosilicate glass is to be sputtered is deeply contoured, special care is needed to coat all the surfaces.

In addition, a highly insulating, low capacitance bond can be made also using a thick layer of solderglass, but because the solderglass layer is fluid during the bonding, again extraordinary measures are needed to control the layer thickness. In addition, solderglasses are difficult to match in thermal expansion to silicon, and often have poor chemical durability.

By contrast, an inlay made by etching a groove into the surface of a layer, in accordance with this invention, and filling it with powdered glass which is then fused solid and polished flat can readily be made with any glass thickness from about 1 micron to about 100 microns. The glass needs to cover only so much of the silicon wafer to be bonded, so that a great deal of the silicon wafer surface remains available for electrical functions such as to serve as a capacitor plate. The total quantity of glass may be a small fraction of the wafer in which it is embedded, so that its thermal expansion difference from the semiconductor material is greatly diluted, as compared to a layer of bulk glass. As will be appreciated by practitioners-in-the-art, in structures of a very high sensitivity, this property is extremely important.

Layer-to-layer capacitance through the glass is inversely proportional to glass thickness, so by choosing an inlay thickness of 16 microns, for example, a bondline capacitance is created about one-eighth as great as that using a sputtered glass film of 2 microns. As will be appreciated further, dielectric strength of the bond is similarly greater for the greater thickness.

In a specific application of the invention herein, as described below in a description of one embodiment, inlays are made in which it is important that the bonding surface on the inlay be essentially coplanar with the surrounding silicon surface or, alternatively, can differ from it by a repeatable, predictable amount. In that embodiment, an air-gap capacitor is constructed, with the gap appearing between the two parts to be joined by the anodic bond to the inlay. Accordingly, the bond line can be coplanar with the silicon surface of the inlaid part and the resulting capacitor gap will be identical to the depth of a recess etched in the mating part, which makes the structure predictable for manufacturing purposes. As discussed above, one embodiment of the use of the glass inlays of the invention is to form a capacitive transducer utilizing a sandwich-type structure wherein the various parts of the structure are joined together by the glass inlays of the invention.

Thus, as illustrative of a process for achieving the sandwich structure discussed, the starting material is a single crystal silicon wafer N or P type (100) plane indexed [110] within 0.7 degree. The initial thickness is selected to be 0.1915 millimeters ±0.005 millimeters (mm). Both sides are polished and then oxidized lightly to about 0.3 microns thickness. Thereafter photolithograph matched index patterns are applied to the front and back oxide coats and the open index spots are reoxidized. Then photolithographic patterns of its grooves, channels and throughholes are opened in the oxide on the front surface, and throughholes in the oxide on the back surfaces. The wafer is then etched in a potassium hydroxide etch slightly more than halfway through (0.99 mm.) to open the throughholes. Subsequently, the front surface is photolithographed, removing the remaining oxide from the central movable portion, leaving the rims intact. Thereafter, using a precise shallow etch (i.e., ion beam milling) 3.5 microns ±10% are removed from the exposed silicon of the front surface, thus forming the capacitor gap.

Following this, all remaining oxide is stripped, and both sides reoxidized with a heavy oxide layer to a thickness of about 0.6 microns. The back surface is photolithographed to leave oxide only over areas to be attached in final etch, and all other oxide is removed. All exposed silicon is then doped with boron to the extent wherein for a depth of 2.2 microns the boron concentration is in excess of $5 \times 10^{19}$ atoms/cc.

In a dry $O_2$ environment, the wafer is reoxidized to reduce to 1.6 microns the net depth in which boron exceeds $5 \times 10^{19}$ atoms/cc. The layer of high doping will taper, in this situation, into lower doping both inward and outward. The oxide should be about 0.6 microns. Photolithography is then applied to leave stop spots of oxide on the face, followed by removal of all other oxide. Finally, the final etchant is applied (ethylene diamine/pyrocatechol [EDP] etchant) to reveal residual membranes of silicon doped more than $5 \times 10^{19}$ atoms/cc.

The lid and base may be principally silicon, with inlays of Pyrex or equivalent to provide insulating, low capacitance bonds between layers, in accordance with the invention herein. Preliminary to this, the rim surfaces of the core which are to participate in the bond must be substantially flat, having local irregularities reduced below 0.25 microns. The procedure for making such composites of Pyrex and silicon is to etch into the silicon recesses slightly deeper than the desired thickness of Pyrex inlay.

The surface to be inlayed is coated with oxide. By photolithography, a pattern is opened in the oxide. Alternatively, abrasive machining may be used. The exposed areas are etched or otherwise developed to a depth of within the range of between about 0.018 and 0.036 mm. The oxide is removed. Thereafter, a glass composition is selected which is expansion matched to the semiconductor and which includes enough alkali to allow anodic bonding. A representative glass is Pyrex type 7070, a product of Corning Glass, in the form of a frit in liquid media such as isopropyl alcohol, for example. The suspension is, preferably, de-stabilized with ethyl acetate, and the frit deposited by sedimentation onto the etched wafer under centrifugal force. As an alternative, the frit may be deposited by silk screening.

In this connection, it is important to maintain the deposited layer mechanically stable. For this reason, the thickness must be limited for each deposit to a thickness of, for example, about 0.012 mm. Three deposits may be made to achieve a desired final thickness of around 0.031 mm. with an intervening firing at within the range of between about 780 degrees Celsius and 1100 degrees Celsius, and, preferably, about 860 degrees Celsius for each deposit. The firing is for within the range of between about 8 and 12 minutes. No separate drying is required to drive off the liquid volatiles prior to firing. Subsequent to reaching the desired thickness, the fused glass is annealed at 500 degrees Celsius for thirty minutes to obtain a solid layer of glass with a thickness greater than the depth of the recesses.

The surface of the wafer is then polished to remove the Pyrex from the undisturbed surface of the silicon and to produce a flat, smooth surface on the Pyrex in the recesses. The base, which is the fixed plate of the capacitor, is coated with a thin aluminum film, which is patterned photolithographically to provide convenient connections, both to the base and to the central layer with the movable plate. The lid requires a recess to permit motion of the moving plate. Such recess is conveniently made by etching in the EDP etchant, which attacks the silicon, but not the Pyrex.

Commercial grades of Pyrex such as Pyrex 7070 powder or frit as discussed above have certain impurities which contain problems in the highly sensitive environment to which the present invention is directed. That is, Commercial 7070 Pyrex frit, as purchased from Corning, appears to have between 0.01% and 0.1% contamination with oxides of elements of higher atomic number than the boron, silicon, sodium, and aluminum of which it is nominally composed, and the contaminants are in discrete particles of the same size as the Pyrex frit. When the Pyrex frit is deposited and fired onto silicon, the particles of higher atomic number oxide are reduced (lose oxygen), and become somewhat conductive. Depending on the size of particle and the thickness of glass deposit, the conductive volume may extend part way or all the way through the thickness of the glass. If all the way, it forms a conductive leak through the glass insulator. If part way, the conductive species in the particle may migrate under the influence of an electric field, and form an electrical leak after a delay.

Elemental silicon is a strong reducing agent. When glass with contaminants is fired on silicon, the surface in contact with air is oxidizing but the surface in contact with silicon is strongly reducing. Near the silicon surface particles of oxides of heavy metals will be reduced, potentially to become conductive. This "activation" of the contaminants in the glass can be avoided by so limiting the time and temperature of fusing the glass deposit that oxygen depletion at the silicon surface does not have time to reduce any significant volume of contaminants. This approach is appropriate for one inlay of the invention, but for the other there is a silicon-oxide-growth step after the inlay is completed.

Another approach is to fire the deposit for so long a time that the silicon surface becomes completely oxidized. The silicon oxide has a lower oxygen diffusion rate than the glass, so the silicon ceases to withdraw oxygen from the glass and the contaminants eventually reoxidize.

If one must use a contaminated source of glass frit, a further approach to accommodating this problem is to pre-oxidize the silicon surface, a procedure discussed above, so the glass deposition is made not precisely onto a silicon surface, but onto a silicon dioxide surface on the underlying silicon. The silicon dioxide forms a barrier to the oxygen which prevents reduction of contaminants by the silicon. The silicon dioxide serves as an electrical barrier, impeding the currents required for the subsequent anodic bonding to the glass. Enough current passes to form a bond, but it takes longer than on bare silicon. If the firing of the glass is continued for a time intermediate between that needed to solidify the glass and that needed to dissolve the silicon dioxide, the electrical resistance of the silicon dioxide layer will be substantially reduced. While not completely understood, it is believed that this is achieved by the diffusion into the silicon dioxide layer by sodium atoms from the glass. The condition needed to solidify a 0.001" layer of Pyrex without substantial reduction of impurities is 880 degrees Celsius in dry $O_2$ for 35 minutes. To oxidize the silicon through the 0.001" glass deposit requires longer than 20 hours at 860 degrees Celsius in wet $O_2$.

Using an underlayer of silicon dioxide 0.25 microns thick, the Pyrex will substantially reduce its electrical resistance after 2 hours at 980 degrees Celsius, and will be indistinguishable from Pyrex without the underlayer after 12 hours at 980 degrees Celsius.

It will be understood, however, that really high purity borosilicate glass makes this additional procedure irrelevant. The formulation of a borosilicate glass frit with contamination of less than 1 part per million heavy metal oxide particles allows the formulation of glass inlays without electrically conductive spots. Since commercial Pyrex frit has reducible contaminants, it is appropriate to follow the procedures discussed above for dealing with contaminants.

There are two objects in using silicon outside layers with Pyrex inlays. One is to go out-of-plane with the fixed electrode to remove the need for a notch in the bonding rim and the need then to plug that notch. The other is to reduce the dissimilarity of thermal expansion among the parts by making them more nearly all one material.

With the foregoing and additional objects in view, this invention will now be described in more detail and other objects and advantages hereof will be apparent from the following description, the accompanying drawings, and the appended claims.

DETAILED DESCRIPTION OF THE INVENTION

Figure 1:
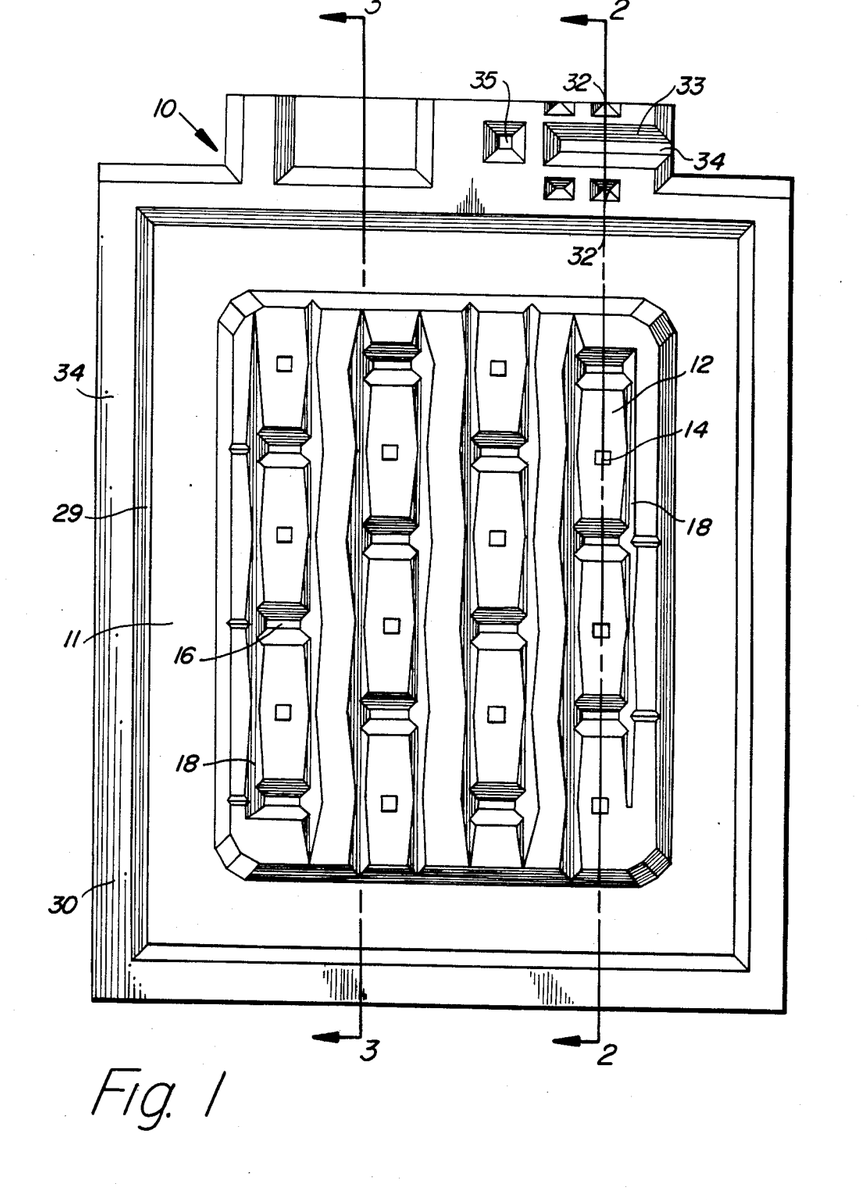
FIG. 1 is a bottom plan view of the capacitor plate of the illustrated embodiment of capacitive transducer which forms the central portion of the sandwich structure providing the capacitive transducer.

Referring to the drawings in which like reference characters refer to like parts throughout the several views thereof, FIG. 1 shows a plan view of the central capacitor plate or core of the illustrated embodiment which plate is placed between the base portion and the lid portion to form a sandwich structure for use as an ultrasensitive capacitive transducer. In fact, the plan view shown of the central capacitor plate is the bottom surface thereof which faces the base section as described above. Thus, capacitor plate 10 includes the central movable plate portion 15, movable in piston-like manner in directions normal to the plane of the paper on which FIG. 1 is shown with the movement thereof being along flexible membrane 11. As can be seen in FIG. 1, the outer surface of membrane 11 is connected to bonding rim 30.

A plurality of perforations or passages 16 are formed in spaced fashion over the surface of movable plate 15. These perforations or passages allow the movement of air in the sandwich structure of the capacitive transducer illustrated, from the bottom surface of plate 15 to the top surface thereof and vice versa. Recess 12 subdivided by groove 18 is in the face surface of the capacitor core 10 in the movable plate portion 15 thereof to form a portion of the lower cavity formed between the base portion of the sandwich structure to be described below, and the central capacitor plate 10. Moreover, the surface recesses and/or grooves form guiding surfaces for air flow damping to guide the air along the surface towards the perforations 16. This serves to provide rapid precisely directed air flow to provide rapid recovery when the opposing plates move close to each other.

During the formation of the core plate portion 10, a plurality of stops 14 are formed in spaced apart fashion over the surface of the central piston-like movable plate portion 15. Thus, the stops 14 are dielectric and serve to prevent electrical contact of the plate 15 with the opposing central surface of the central fixed base of the sandwich structure. This, in turn, prevents pneumatic latch-up so that the air may flow rapidly in between the plates.

Figure 2:
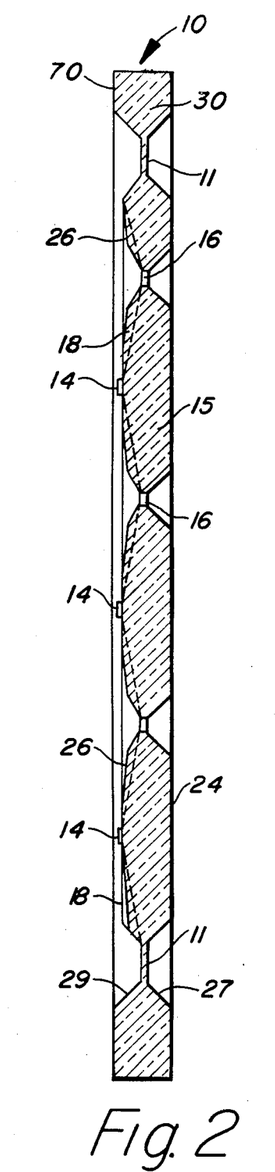
FIG. 2 is a sectional view taken along lines 2—2 of FIG. 1.

Referring now to FIG. 2, this view is of a section through the central plate portion 10. As can be seen in FIG. 2, surface 26 is etched below the actual rim surface 70 of plate 10. Etched to a lesser depth are the series of stops 14, to provide the engaging surfaces of the flexible piston-like plate 15 in its movement toward the opposed fixed capacitor plate formed in the base portion of the sandwich structure. Shown in dotted line fashion in surface 26 of plate 10 are the configuration of the air flow damping grooves 18. "Ramps" 27, 29 extend from the surfaces 24, 26, respectively to form the membrane 11 upon which plate 15 is suspended for its movement.

It should be understood here that the dimensions of etching depths are extremely small in the devices being produced. Thus, the etching depth of the surfaces of stops 14 and surface 26 below surface 70 would not be visible to the naked eye in the showings of FIG. 2. The showings are extremely exaggerated, as well as others in this discussion, for the purposes of clarity. The overall size of the capacitor described is discussed below.

Figure 3:
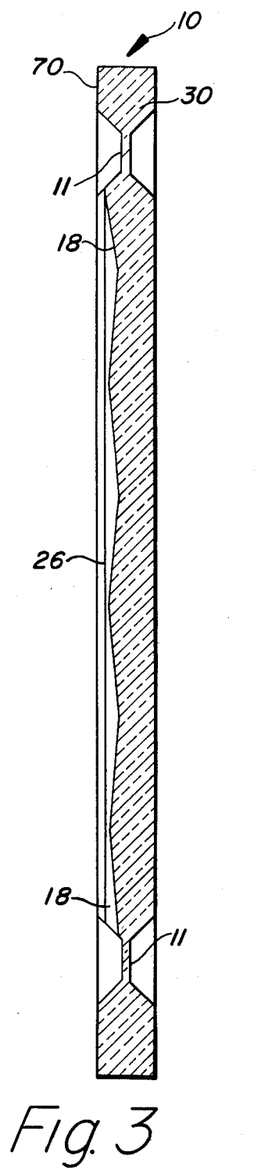
FIG. 3 is a sectional view taken along lines 3—3 of FIG. 1.

Referring now to FIG. 3, this section shows the same capacitor face surface 26 with damping grooves 18. This sectional view is through an area not having any perforations.

Figure 6:
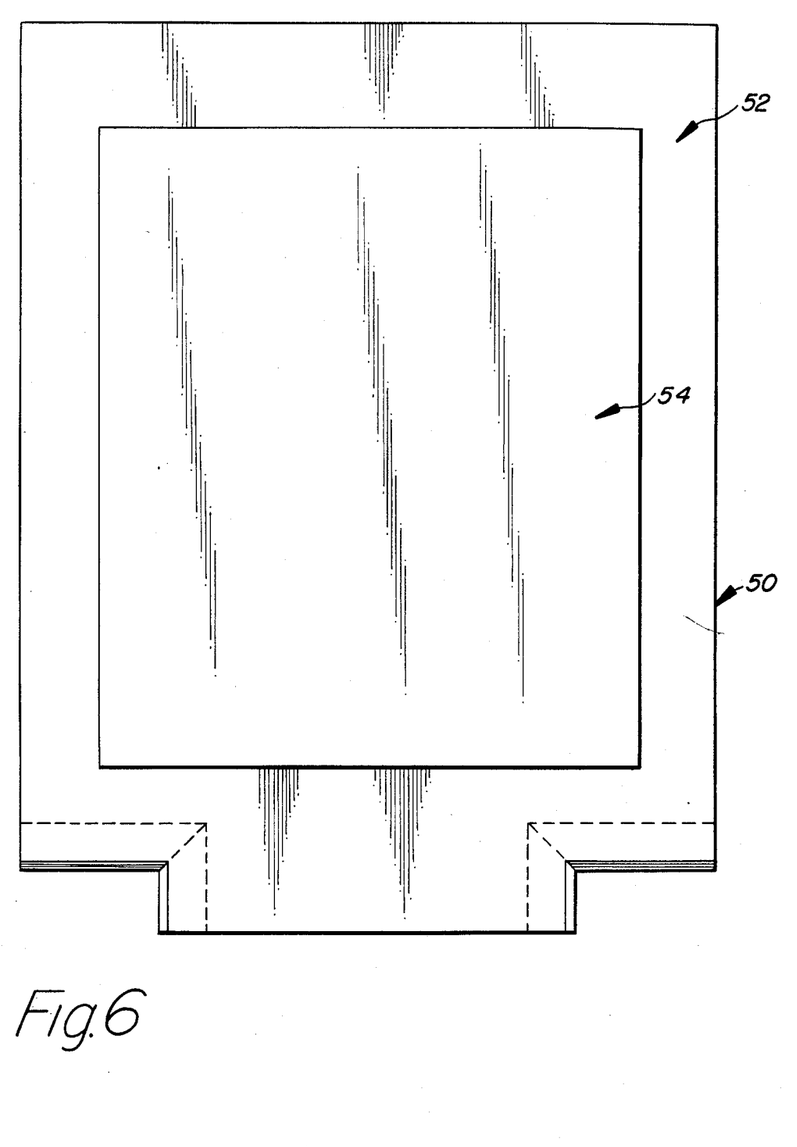
FIG. 6 is a plan view of the bottom surface of the lid of the sandwich structure removed from the core capacitor plate portion thereof.
Figure 7:
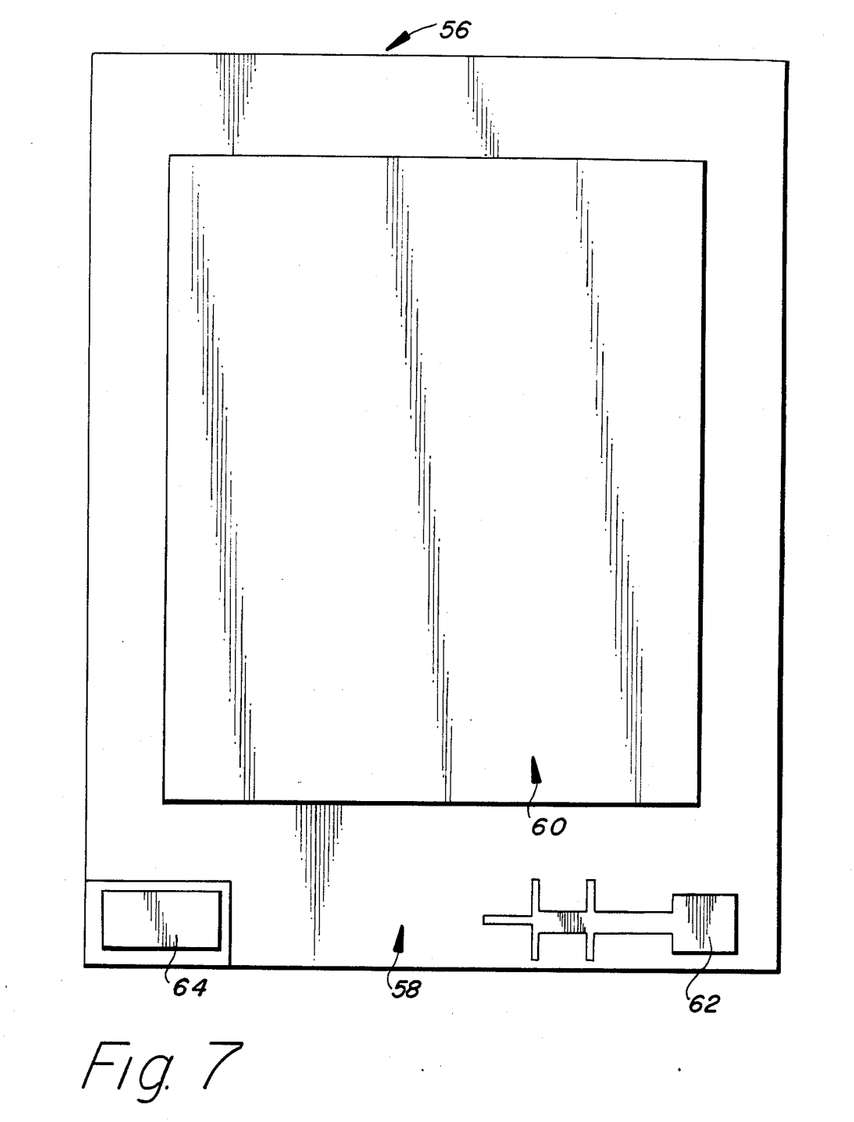
FIG. 7 is a plan view of the base portion of the sandwich structure showing the internal upper surface of the base, which faces the central core plate portion.
Figure 8:
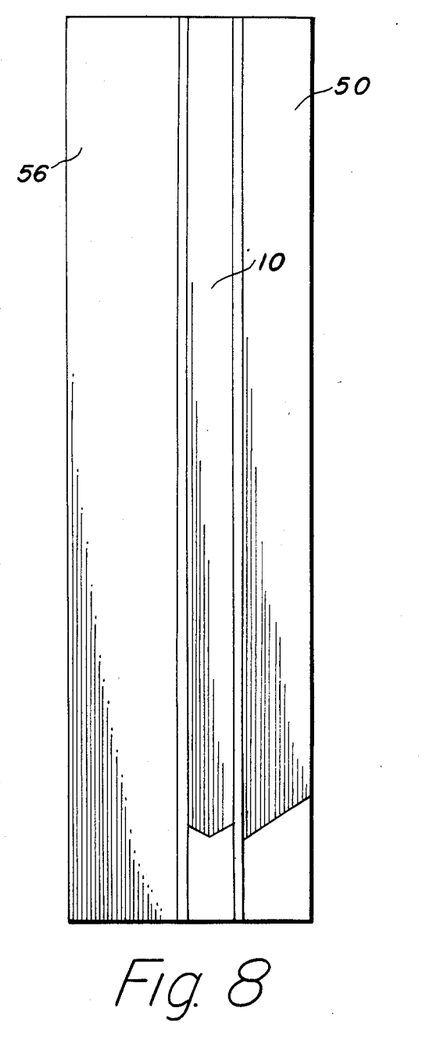
FIG. 8 is a side elevational view of the capacitive transducer sandwich structure.

FIGS. 5-8 show the sandwich structure of the capacitive transducer of the invention. For example, FIG. 8 shows the joined together sections including base 56, core 10 and lid or top 50.

Figure 4:
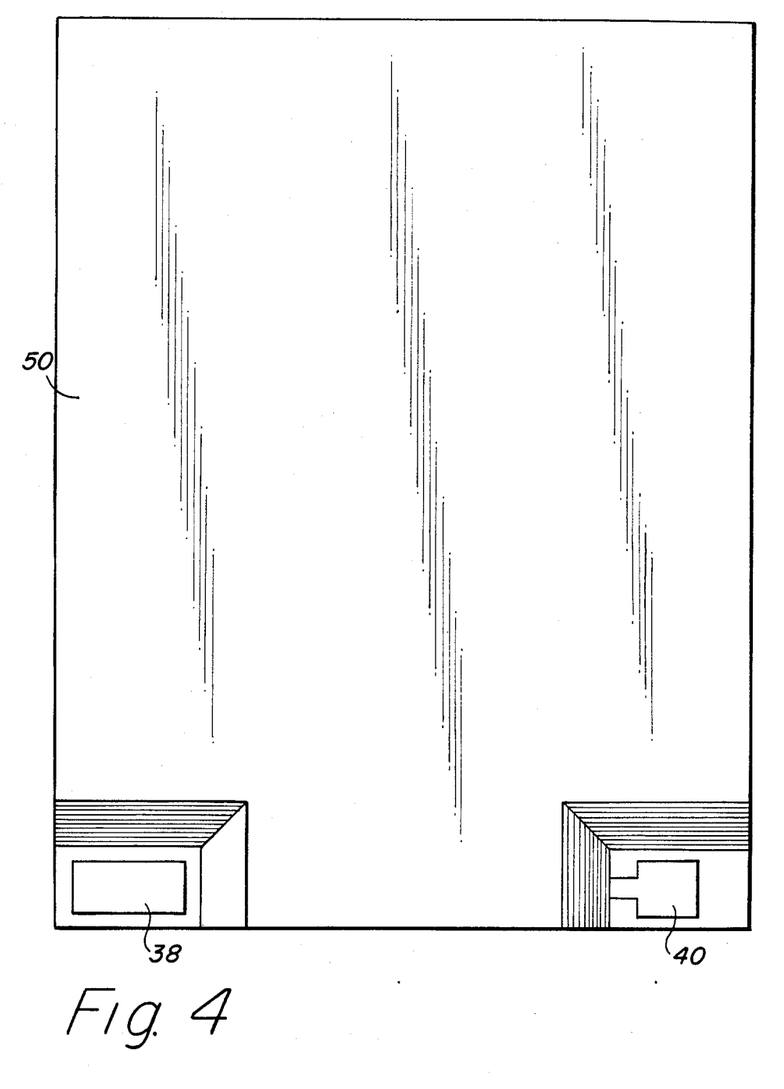
FIG. 4 is a top plan view of the capacitive transducer showing the top surface of the sandwich structure thereof.
Figure 5:
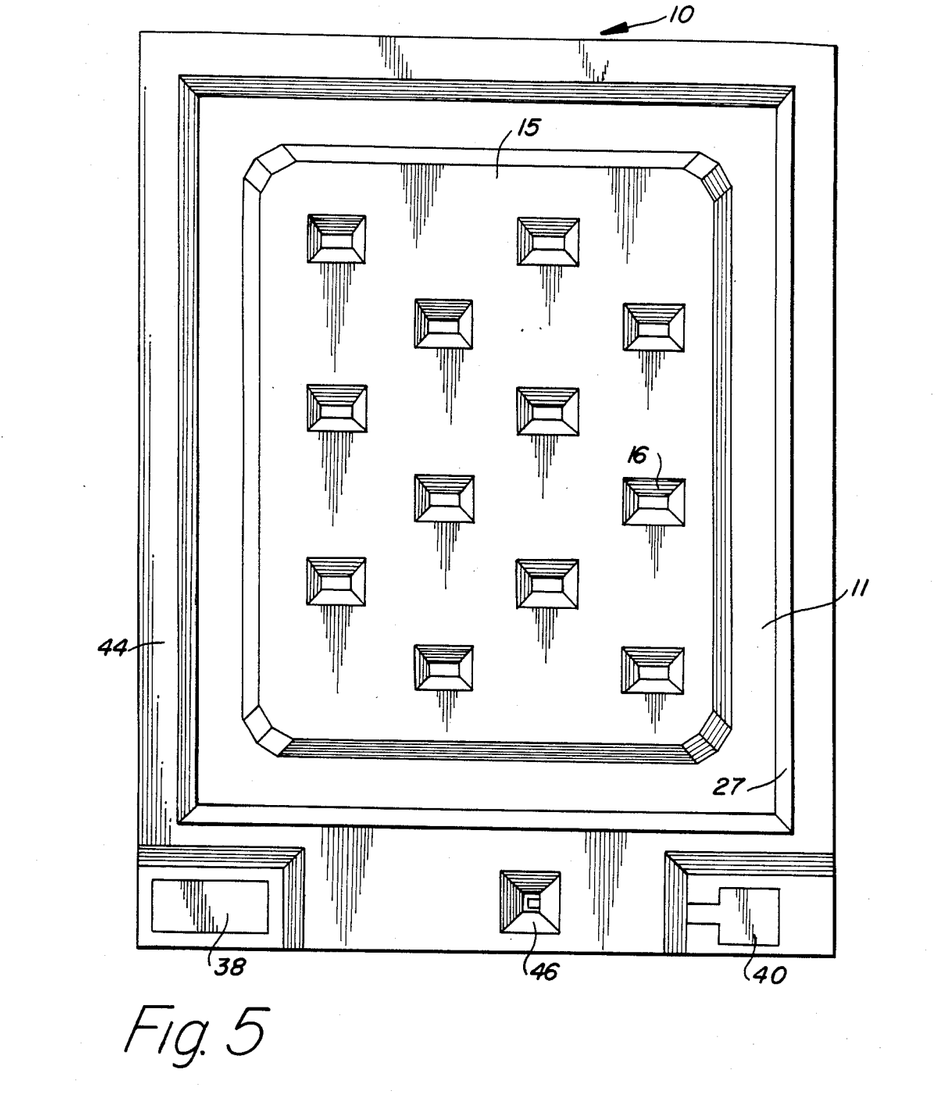
FIG. 5 is a top plan view of the core or capacitor plate with the lid or top portion of the sandwich structure removed.

FIG. 4 shows the top plan view of the sandwich structure illustrated including the outer surface of lid 50 together with the base contact 38 and the core contact 40. When the lid portion 50 is removed from the top face of the central core portion 10, the exposed inner surface of lid 50 looks as shown in FIG. 6. That is, a rim portion, in the form of the film 52 of the invention, extends around the outer surface of the silicon crystal forming the lid. In this connection, a representative thickness of the Pyrex film of the invention formed from fritted Pyrex granules as discussed above, and described in more detail below is about 0.020 mm. in its polished and/or lapped form. The central portion 54 is bare silicon etched back from the engaging surface of the lid 0.0088 mm. Thus, this etched back bare silicon surface has the effect of forming a portion of the cavity of the sandwich structure. When the lid 50 is removed from the upper surface of the central core 10, the appearance of the top surface of the central core is as shown in FIG. 5. As can be seen in FIG. 5, a plurality of holes or perforations 16 are formed in the top surface of the core portion 10 in the movable plate section 15 thereof, which is movable on membrane 11.

Referring now to FIG. 7, when the base 56 is removed from the central core portion, the facing surface of base 56 looks as shown in FIG. 7. In this case, base 56 also includes a Pyrex film rim 58 of the invention formed in the same manner as the Pyrex film rim formed in the lid portion of the sandwich structure, as discussed above. Contact 62 is a Pyrex-insulated metal contact to plate 10 and is isolated from contact with base 56, while contact 64 is a metal/silicon contact for base 56. The silicon at the surface portion 60, which forms a fixed capacitor plate, is etched back 0.003 mm., as representative of a specific dimension. This flush portion, again, forms a portion of the cavity in which plate 15 flexes in the sandwich structure.

FIG. 1 shows the bottom plan surface of the central core portion 10 with appropriate recesses 32, 34 and 35, forming a plurality of spaced apart silicon ridges or bars which contact area 62 on base 58. Narrow bars 33 are formed between isolated pits 32 and 35 to contact 62 shown in FIG. 7. Pit 35 extends clear through core 10 into pit 46 (FIG. 5) affording a view of metal contact 62 for visual alignment. The various contacts serve to connect the apparatus to appropriate circuitry for reading the change in capacitance produced by a change in measured acceleration or pressure.

The capacitive transducer described is extremely small, as discussed above briefly. As purely illustrative of dimensions which may be used in producing the sandwich-type capacitive transducer of the invention, the thickness of the sandwich structure may be, for example, 0.946 mm. Assuming this dimension for the thickness, the width may be 2.69 mm. and the length 3.48 mm.

Figure 9:
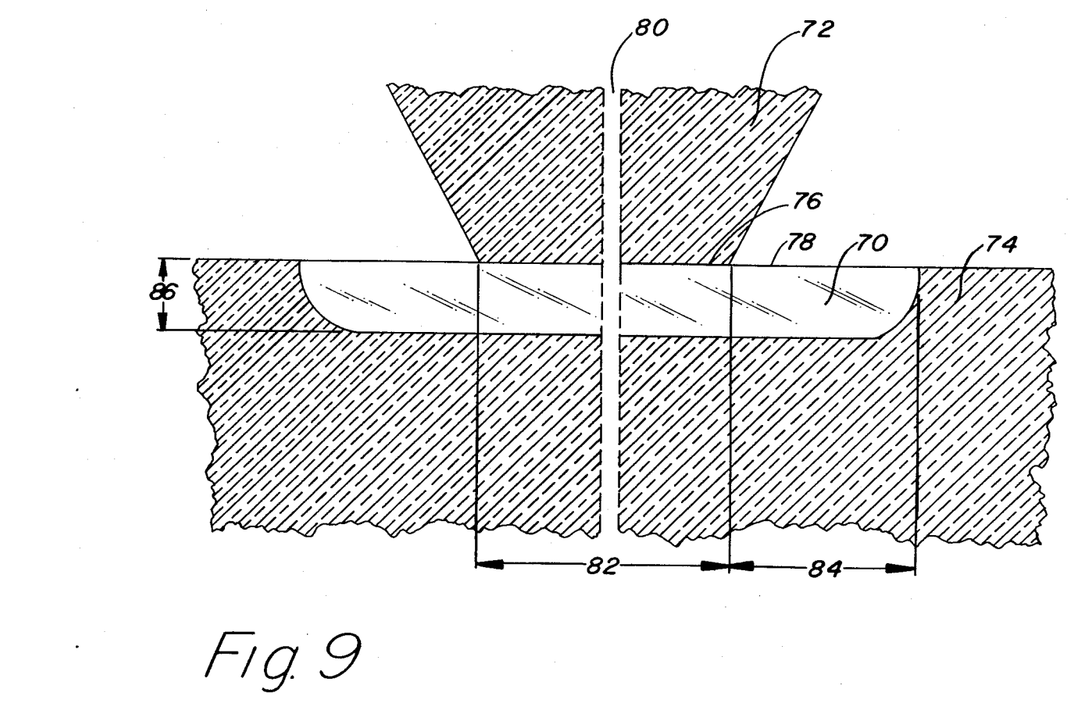
FIG. 9 is a partial sectional view of the bonded margin between dice divided by sawing and illustrating the glass inlay bond of the invention.

Referring now to FIG. 9, FIG. 9 is a view in section showing a bonded margin between dice which are to be sawed from a wafer formed for producing, for example, the capacitive transducer structure described above. As can be seen in FIG. 9, the bonded portion is between the surface 76 of the bonded part 72 bonded to a substrate 74 by surface 76 being joined to the surface 78 of inlay 70 formed in substrate 74. 80 indicates the saw kerf formed when two dice are sawed apart in a wafer developed in accordance with the procedures discussed above. In FIG. 9, 86 indicates the inlay depth, 82 indicates the bond surface length, and 84 indicates the clearance area length formed on each side of the actual bonded surfaces where an additional extent of inlay is available in order to avoid arcing at the elevated temperature and voltage used for anodic bonding.

Figure 10:
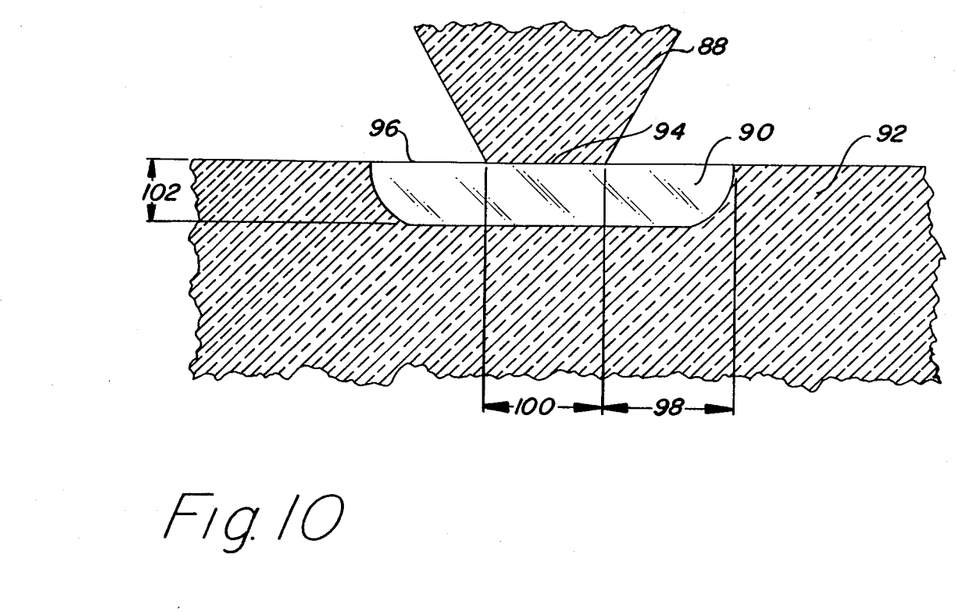
FIG. 10 is a partial sectional view of the bonded margin internally of the structure, away from the edges, and further illustrating the glass inlay of the invention.

Referring to FIG. 10, a partial sectional view is shown of an internal bond between a bonded part 88 and a substrate 92. The surfaces joined are surface 94 of the bonded part 88, and surface 96 of the inlay 90. In this view, 102 designates the inlay depth, 98 the clearance length and 100 the bond length.

Further with respect to the dimensions of the glass inlays of the invention for anodic bonding, the dimensions are unlimited in some directions and limited in others. The dimensions currently used for inlay depth 86, 102 are within the range of between about 0.0152 millimeters and 0.0254 millimeters. The length of the interior bond line is about 0.127 millimeters with the width of an edge or sawed bond line of about 0.457 millimeters. The clearance dimension is about 0.076 millimeters. It is to be understood that these dimensions are illustrative only and particularly for the purposes of describing representative dimensions in a capacitive transducer embodiment as illustrated above.

While the depth of the inlay 70, 90 may be as low as 0.002 millimeters (2 microns), as would be indicated by published data, in the practical application of the inlays utilized in the invention herein, it has been found that the lower limit is 0.005 millimeters. This "modified" lower limit is set by imperfections of the glass of the inlay. There is no particular upper limit in the depth of the inlay. With a sufficiently deep inlay, the far surface of the substrate can be lapped back to the inlay so that, in effect, the inlay extends through the substrate. Depth is chosen as a compromise between low capacitance achieved by a deep inlay, and small thermal expansion stress, achieved by a shallow inlay.

Bond length in the interior portion of an assembly may be as narrow as the surfaces can be defined. In a practical application, this length may be, for example, 0.0076 millimeters. However, if a stiffness requirement is desired, then the interior bond may be more in the range of 0.127 millimeters. Edge bonds, on the other hand, which are subjected to sawing, must have enough width to accommodate the saw kerf, and to withstand saw damage. Thus, the width of the bond beyond the kerf will generally be within the range of between about 0.1 millimeters and 0.518 millimeters beyond the saw kerf. For example, an edge line of 0.457 millimeters may be used to accommodate a saw kerf of 0.127 millimeters, thus leaving two bonded edges of 0.165 millimeters in length, each of which may have 0.051 millimeters of saw damage.

The width of the inlay must exceed the width of the bond line by enough to avoid arcing at the elevated temperature and voltage used for anodic bonding. Thus, the clearance dimensions 84, 98 shown in FIGS. 9 and 10. A representative clearance dimension on either side of the bond may be, for example, 0.076 millimeters, assuming that the parts can be positioned within 0.025 millimeters. Furthermore, this assumes the closest approach across the surface of the glass inlay will be 0.051 millimeters. This clearance is substantially the minimum acceptable amount. More clearance can be provided by greater inlay width, but at a cost of more glass.

In the illustrative embodiment, the quantity of glass employed must be kept small because of the acute sensitivity to thermal expansion difference between glass and silicon. In other layered structures not illustrated herein, less sensitivity to thermal expansion stress may be allowable and the design may be more generous with the quantity of inlay glass.

While the methods and the products produced by the methods herein disclosed form preferred embodiments of this invention, this invention is not limited to those specific methods and products, and changes can be made therein without departing from the scope of this invention which is defined in the appended claims. For example, the process and products developed from the process forming the invention herein may be modified for providing silicon pressure transducers, as will be apparent from the clear teachings of this specification.

What is claimed is:

1. A method for bonding two surfaces of the same semiconductor together, characterized by the steps of
    (a) selecting in a first selecting step two semiconductor surfaces to be bonded;
    (b) selecting in a second selecting step one of said two semiconductor surfaces from said first step;
    (c) etching a groove into the surface selected from said second selecting step;

(d) said etching step being over said selected surface between said two surfaces selected from said first selecting step;
(e) filling said groove obtained from said etching step with powdered glass;
(f) fusing said powdered glass from said filling step into a solid mass;
(g) polishing in a first polishing step the resulting exposed surface of said solid glass mass obtained from said fusing step to the extent necessary to obtain a desired bonding surface;
(h) polishing in a second polishing step the other of said semiconductor surfaces obtained from said first selecting step; and
(i) anodically bonding the polished surfaces obtained from said first and second polishing steps.

2. The method of claim 1, further characterized by
(a) said filling step being carried out by sedimentation.

3. The method of claim 1, further characterized by
(a) said filling step being carried out by silk screening.

4. The method of claim 1, further characterized by
(a) said etching step being carried out only to the extent necessary to effect the desired bond width.

5. The method of claim 1, further characterized by
(a) said etching step being carried out by etching said groove to a depth of within the range of between about 0.018 and 0.036 millimeters.

6. The method of claim 1, further characterized by
(a) said first polishing step being carried out to the extent necessary to obtain a flat surface continuous and coplanar with said semiconductor surface obtained from said second selecting step.

7. The method of claim 1, further characterized by
(a) said etching step being carried out to the extent necessary to obtain a groove larger than the extent of bond surface required for said anodically bonding step to provide a clearance on either side of said bond width for avoiding arcing during said anodically bonding step.

8. A structure comprised of at least two semiconductor wafers with the opposed surfaces of said semiconductor wafers being bonded together by the process as claimed in claim 7.

9. The method of claim 1, further characterized by
(a) said fusing step being carried out at a temperature of within the range of between about 780 degrees Celsius and 1100 degrees Celsius.

10. The method of claim 1, further characterized by the additional step of
(a) sawing through the bonded length obtained from said anodically bonding step to obtain at least two structures formed of two bonded together semiconductor surfaces.

11. A structure comprised of at least two semiconductor wafers with the opposed surfaces of said semiconductor wafers being bonded together by the process as claimed in claim 10.

12. The method of claim 1, further characterized by
(a) prior to said etching step, coating the surface from said second selecting step with oxide; and
(b) opening a pattern to be etched in the surface obtained from said coating step by photolithography.

13. A structure comprised of at least two semiconductor wafers with the opposed surfaces of said semiconductor wafers being bonded together by the process as claimed in claim 12.

14. The method of claim 1, further characterized by
(a) prior to said etching step, coating the surface from said second selecting step with oxide; and
(b) opening a pattern to be etched in the surface obtained from said coating step by abrasive sawing.

15. A structure comprised of at least two semiconductor wafers with the opposed surfaces of said semiconductor wafers being bonded together by the process as claimed in claim 1.

* * * * *